Dec. 18, 1962   A. M. CADDELL   3,068,850
FOUR-SIDED PISTON AND FLUID SEALING MEANS
Filed March 20, 1961
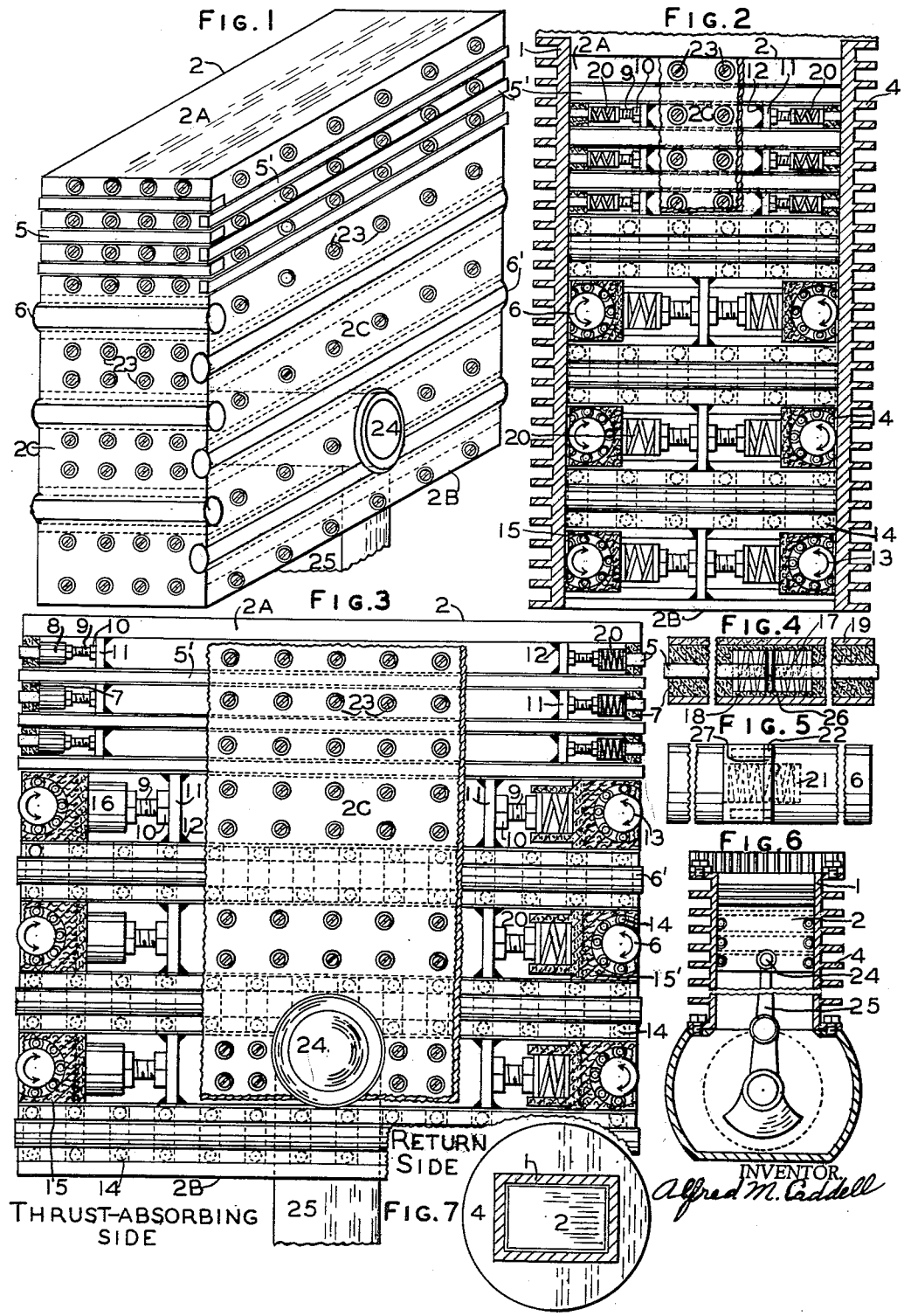

United States Patent Office 3,068,850
Patented Dec. 18, 1962

3,068,850
FOUR-SIDED PISTON AND FLUID
SEALING MEANS
Alfred M. Caddell, 1318 W. Hunting Park Ave.,
Philadelphia 40, Pa.
Filed Mar. 20, 1961, Ser. No. 97,108
11 Claims. (Cl. 123—193)

This application is in part a continuation of the application of the same title, Serial No. 782,453, filed Dec. 23, 1958, and now abandoned.

A four-sided piston such as one having 2 x 4 or 2 x 6-inch dimensions, permits many outstanding improvements to be incorporated in an advanced type of power-plant, of which this invention comprises the basic part. Among other features are the possibilities of employing no-spring, positive-action valves; also, the employment of considerably longer power strokes to permit increased leverage on the crankthrow; the use of expansion-type, compression-retaining bars in the top of the piston and rollers mounted in bearings in the piston sides to take the place of conventional piston rings; and, of paramount importance, the employment of means whereby maximum fluid pressure, either steam or combustion gas, can be retained at top center of the crankthrow for an infinitesimal period of time (measured in fractional thousandths of a second) until the crankpin arrives at approximately 30 degrees past top center on the power stroke.

This means that the energy in a working fluid becomes applicable only at a favorable leverage position on the power stroke—not before, as is presently the case, the crankpin has arrived at a position in the cycle that prevents the great powers of leverage being harnessed to do work.

In this connection, it is important to note that an engine employing a piston measuring 1.75 x 4.60 inches has a square-inch area equivalent to that of a round piston having a diameter of 3.20 inches. However, the crankthrow (leverage) of a 3.2-inch diameter, 3.2-inch stroke piston would be limited to a radial throw of 1.6 inches; whereas a piston having the long dimension of 4.60 inches and a 4.60-inch stroke would have a radial throw of 2.30 inches, a gain of .7-inch in the crankthrow. For such an equivalent square-inch head area, therefore, the oblong piston posts a net gain of .7-inch for the development of leverage.

Both of these crankthrows, that of the round or the oblong piston may, of course, be increased, but the long dimension of an oblong piston will in all cases permit greater crankthrow compared to the limitations imposed by a round piston. Other factors being equal, the square-inch area of either a round piston or an oblong one in a naturally aspirated engine governs, in connection with the length of the induction stroke, the volume of the fuel-air intake. Therefore, due to greater crankthrow, or leverage, made possible by the oblong compared to the crankthrow of a round piston, much greater energy per pound of fuel will be put out by the oblong type.

In addition to the foregoing features offered by this four-sided piston, a new type of compound engine and correlated means for converting into additional power the energy now going to waste in the exhaust, may become a practical reality.

The Shortcomings of Rings

In conventional cylinder-type internal combustion engines, a piston is installed loosely in its cylinder to allow for expansion of the metal composing it while operating under high frictional and combustion heat conditions. These loosely installed pistons, in turn, have a number of loose, split rings inserted in grooves in the piston wall, usually about three and in high-power engines six, which rings have built-in elasticity for maintaining as long as possible tight, though movable contact with the cylinder wall.

Throughout the reciprocal travel of several thousand linear feet per minute, a conventional piston shivers and whips, although imperceptibly, first one side and then the other, in keeping with the side-thrust pressures alternatedly developed by the crankthrow and the in-and-out movement of the piston rings. Due to the reaction caused by the crankthrow, the side of the piston opposite said throw causes the rings to retract fully in their grooves and the body of the piston itself to rub hard against the cylinder wall throughout the entire length of the power stroke and, when the piston's travel is reversed, almost as hard against the other side of the cylinder wall with consequent retraction of the rings and rubbing of the piston thereagainst. Thus, during every revolution of the crankshaft, a sum total of frictional resistance generated by the piston consumes a log of the energy developed in the cylinder. This consumed energy is called "engine power," which is the power required just to keep the engine turning over without doing useful work. And, in addition to the power losses involved, the scraping of rings against a cylinder wall thousands of times per minute while functioning under high heat operating conditions aggravates the transfer of combustion heat from the piston to the cylinder walls for external dissipation therefrom.

Side thrust pressure of a piston against a cylinder wall, as in a conventional engine, is the dominant factor that limits the radius of the crankthrow and, therefore, the leverage that can be employed for converting energy into power. This factor has always militated against use of long power strokes to obtain maximum power output, for under present-day cylinder and piston construction, whatever output of energy could be gained by leverage would be lost in side-thrust friction and cylinder wear.

In an attempt to minimize such friction and make available a cooler operating engine, engine manufacturers have swung largely toward the short stroke, but at the same time increasing the bore and the r.p.m. in order to build up the torque necessary to move a vehicle. Obviously, however, a short-stroke engine means sacrifice of leverage on the crankthrow and, in turn, a larger bore means increased consumption of fuel.

In contrast, by means of this invention the greatly increased leverage made possible by a longer-than-presently-permissible stroke and the practical elimination of side thrust friction, will permit greater energy output per pound of fuel. Furthermore, an engine constructed according to this invention would have to turn less than half the present crankthrow r.p.m. to put out equivalent energy, a factor that translates into greater efficiency and longer engine life.

Sealing Qualities of Rings

Inasmuch as conventional rings are of one-piece, split construction, they leave much to be desired in the way of long-life, fluid-sealing qualities. Being loose in their piston grooves and subjected to high linear travel speed, they reverse their direction of travel only after the piston itself has reversed its travel. Consequently, the piston grooves wear larger and the rings narrower, permitting a larger clearance space therebetween. The edges of the rings also wear and permit fluid leakage which they were initially designed to prevent. Due to the formation of carbon in back of and on the sides of the rings, ring sticking frequently occurs. When this happens, the working fluid blows past the rings, cutting or burning off the oil film and causing development of high spots resulting from unprotected metal-to-metal contact. This, in turn, leads to scored cylinders and pistons, causing power to fall off precipitously and quick ruination of the engine.

Four-Sided Piston Sealing Means

The employment of a four-sided piston in its correspondingly shaped chamber permits to a major but not to a complete extent the use of rollers in the sides of the piston in place of the aforesaid in-and-out rings. Compression-retaining bars extend through slot-like openings in the piston walls near their tops for contacting the chamber walls and effecting sealing of the working fluid. Throughout the remainder of the piston's depth, rollers cradled in bearing assemblies likewise extend through slot-like openings in the sides of the piston to contact the chamber walls and maintain the piston in absolute alignment relative thereto.

On the side of the piston that absorbs the thrust of the crankthrow, both the compression-retaining bars and the rollers are mounted in a fixed, though adjustable, contact setting and extend beyond the piston walls a few thousandths of an inch, thus maintaining the piston a distance at all times from the chamber walls regardless of said side thrust. However, on the return side opposite the thrust-absorbing side, both the bars and the rollers are spring-loaded, thus permitting in response to operating temperatures expansion or contraction of the piston during operation and the maintenance of fluid seal again without the piston itself coming in contact with the chamber walls during said return stroke.

As will doubtless be apparent, these rollers minimize friction and, by keeping the piston away from the chamber walls, prevent destruction of the lubricant. Also, by maintaining steady alignment of the piston during reciprocal travel, they prevent the development of piston slap, which is the tell-tale evidence of wear caused by conventional rings in conjunction with piston side thrust. Moreover, inasmuch as the crankthrow is designed to occur on the long side of the oblong piston, the compression-retaining bars and rollers on the comparatively narrower side of the piston absorb the thrust of the crankthrow, while the bars and rollers on the other three sides, besides acting as fluid sealers, serve the purpose of maintaining undeviating alignment of the piston in its reciprocal travels. Which points up the fact that through the use of rollers and compression-retaining bars, side thrust friction can be kept to the barest minimum and the great inherent advantage of leverage utilized to transform energy into increased power output.

Other outstanding advantages in engine operation offered by this four-sided piston will become apparent as the herein description proceeds.

In the drawings:

FIG. 1 is a three-quarter view of an oblong piston.

FIG. 2 is an exposed view of the narrow dimensioned end of an oblong piston positioned within a conventional outwardly-finned stress-supporting chamber. Adjustable means for regulating fixed and spring pressures against the compression bars in the top area of the piston and the rollers in the lower part thereof are shown herein.

FIG. 3 is an exposed view of the wide dimensioned side of an oblong piston. The compression bars and the rollers are mounted in the piston at different heighths, or levels, so that the bars and the rollers on one level will not interfere with those on the narrow dimensioned sides.

FIG. 4 is an enlarged cross-sectional, fragmentary view of a compression-retaining bar showing built-in pressure means for spreading the bar endwise to maintain end pressure against the chamber walls positioned at right angles thereto. Other spring means for maintaining full broadside pressure against the chamber walls opposite the bars are shown in FIGS. 2 and 3.

FIG. 5 is an enlarged partial view of an individual roller, showing one section thereof freely pinned to its mating section with spring spreader means therebetween for maintaining endwise contact against the chamber walls positioned at right angles thereto.

FIG. 6 is an exposed side view of a single chamber engine, showing the removable head thereof and the side view of an oblong piston connected by a rod to a crank assembly.

FIG. 7 is a view, looking downward, of a single engine block without a head, showing an oblong piston within a correspondingly shaped chamber encompassed by stress-supporting fins, such as 4.

The walls comprising chamber 1 are shown in cross section in FIG. 2, which walls may have conventional stress-supporting fins, such as 4, extending outwardly therefrom. Piston 2, which has a head 2A, a bottom 2B and side walls 2C, moves within its chamber in undeviating alignment irrespective of the pressure developed on its thrust-absorbing side for, as will be noted by referring to FIG. 3, both the compression-retaining bars at the top of the piston and the rollers in the thrust-absorbing side are unsprung, whereas the bars and rollers on the other three sides have spring pressure applied thereagainst to allow for expansion and contraction of the piston under high temperature operating conditions.

Bars 5 on the thrust-absorbing side, FIG. 3, are movable between encompassing sleeves 7, which are composed of a substance such as carbon graphite, which does not expand under any degree of heat encountered in internal combustion operation and which affords lubrication to the bars.

These bars, in turn, are backed by blocks 8 which may be moved inwardly or outwardly in accordance with the pressure applied via screw-bolts 9, which may be locked in position by nut 10. This screw-bolt combination abuts wall 11, which may be secured to the piston structure by welding means, as at 12.

Rollers 6 on the thrust-absorbing side of the piston are likewise unsprung. They, too, extend through slot-like openings in the wall of the piston in which they are mounted a distance beyond said wall. As depicted by double-ended arrows 13, FIG. 3, these rollers rotate in accordance with the reciprocal travel of the piston.

As shown in side view in FIGS. 2 and 3, these rollers are cradled in semicircular bearing assemblies 14 mounted in housing 15, which likewise is composed of a substance that does not expand under temperatures encountered in internal combustion engine operation.

FIG. 3 shows the compression-retaining bars installed in the piston. The bars in the sides that are opposite to each other and that face walls positioned at right angles to the side of the piston shown in FIG. 3, are designated as 5, whereas the bars mounted broadside in said FIG. 3 are designated 5'.

Likewise the rollers in the sides of the piston opposite each other and which face walls positioned at right angles to the side of the piston shown in FIG. 3, are designated 6, whereas those mounted broadside in said FIG. 3 are designated 6'.

As will be observed, provision is made for minute adjustment of both the bars and rollers so that only contact pressure need be applied against them on the thrust-absorbing side of the piston. By adjusting screw bolts 9 on each of the sides of the piston that are opposite to each other, the contact pressure of the bars and rollers is applied the full length thereof against the chamber walls. Housings 15 on the thrust-absorbing side of the piston are held in alignment under said contact pressure by tubular blocks 16, and housing 5' on the return side by spring pressure as aforesaid, said pressure being regulated by adjustable screw-bolts 9, which are locked in position by nut 10 and which abut walls 11, said walls being welded to the piston structure, as at 12.

On the other three sides of the piston, compression springs 20 maintain pressure against the compression-retaining bars that contact the wall of the chamber opposite thereto. This pressure is automatically regulated in accordance with the temperature and metal expansion under which the piston labors.

In addition to the just-described means for maintaining broadwise pressure against the compression bars and rollers in their respective piston sides, both bars and rollers also house means in themselves for maintaining endwise pressure against the walls of the chamber positioned at right angles to the wall in which they are mounted. An enlarged linear view of a bar is shown in abbreviated form in FIG. 4. In this view, the bar is shown in divided form, gap 26 representing a few thousandths of an inch separating the divisions of the bar.

Tension springs 17 are mounted in a recess within circular sleeve 18. A spring is secured to each section of the bar for maintaining endwise contact against the wall of the chamber positioned at right angles to the walls against which these bars have broadside contact. In effect, this endwise pressure, in conjunction with the broadside pressure otherwise exerted, is designed to retain pressure of the working fluid at the inside corners of the chamber walls. Circular sleeve 18 is positioned in housing 19, said housing extending the full length of the piston wall in which the bars may be mounted.

A similar spring-loaded means for maintaining end pressure of a roller is shown in FIG. 5, compression spring 21 permitting linear expansion or contraction of the roller without disturbing its broadside relation with the wall of the chamber against which it maintains contact. These rollers are also divided into two sections, gap 27 separating them by a few thousandths of an inch. FIG. 5 shows holes in one part of the roller into which pins 22 are inserted, as per dotted outline, to maintain slidable engagement between the roller sections. Although endwise contraction or expansion may occur under operating conditions, the roller will function as a sole unit.

As shown in FIG. 1, piston 2 is of fabricated construction, the outer walls thereof being disengagable from the inner body. Screw-bolts 23, which, besides being countersunk and installed flush with walls 2C of the piston, may also be locked in position to avoid becoming loose during engine operation. When assembled, the walls of the piston present a smooth surface therefor. Access to the interior of the piston may be had simply by removing these screw-bolts.

FIGS. 1 and 3 show piston pin 24 positioned in the piston between the narrow dimensions thereof in order that connecting rod 25 shall have the maximum crank throw made possible by the oblong construction of this piston.

Having described my invention, I claim:

1. In an engine operated by a pressurized fluid, a structure having a body, a top, a bottom and side walls, two of said walls being positioned at right angles to two other walls to comprise a four-sided piston for reciprocating in a chamber having a head and walls spatially encompassing said piston, a plurality of openings in each of said piston walls, said openings communicating with the interior of said body, a number of bars freely installed and adjustable means therefor in said body and extending through certain openings to maintain sidewise contact with the chamber walls opposite thereto and endwise contact with the chamber walls at right angles therefrom for effecting maximum sealing of said fluid between the top of said piston and the head and walls of the chamber, a plurality of rollers and adjustable means therefor anti-frictionally installed in each of the sides of said body, said rollers extending partially through other of said openings to maintain sidewise contact with the chamber walls opposite thereto and endwise contact with the chamber walls at right angles therefrom for minimizing friction between the rollers and chamber walls and maintaining undeviating alignment of the piston during its reciprocating movements.

2. In an engine having a crankshaft and made operable by a high-temperature, high-pressure fluid, a structure having a body, a top, a bottom and side walls, two of said walls being positioned at right angles to two other walls to comprise a four-sided piston, a chamber having a head and walls spatially encompassing said piston for its reciprocal travel therein, said piston being connected to said crankshaft for converting the energy in said fluid into power by the crankthrow of said shaft, a plurality of slots formed in each of said side walls, a plurality of movable bars mounted in said body and extending partially through said slots for retaining pressure in said fluid between the top of the piston and the chamber head, a plurality of rollers mounted in each side of said piston between the bars and said bottom and extending partially through other of said slots, said piston having a thrust-absorbing side opposite the direction of said crankthrow, means within said piston on said latter side for applying via its bars and rollers fixed pressures against the wall of the chamber opposite thereto to maintain a prescribed distance between said piston and said wall, and means within said other sides for applying varying pressures via their respective bars and rollers against their respective chamber walls to maintain undeviatingly, according to the degree of expansion or contraction dictated by said temperature, the space between said piston and said walls during said reciprocal travel.

3. The piston described in claim 2 wherein the bars on the piston's thrust absorbing side have four surfaces, one surface for contacting the wall of the chamber opposite thereto, an inner surface for receiving said pressure thereagainst and a top and a bottom surface.

4. The piston described in claim 2 wherein the bars on said other sides have four surfaces, one surface for contacting the wall of the chamber opposite thereto, an inner surface and a top and a bottom surface positioned between sleeves comprised of a substance having oilless bearing properties, members secured in said body on said other sides, adjustable expansion and contraction means positioned between said members and said inner surfaces for maintaining, according to the dictates of said temperature, a space between said piston and the respective chamber walls during said reciprocal travel.

5. The piston described in claim 2 wherein said rollers are cradled in bearing assemblies housed in structures on said thrust-absorbing side, members secured in said body and means between said members and said structures for applying fixed pressures against said structures for maintaining a prescribed space between said piston and its respective chamber wall.

6. The piston described in claim 2 wherein the rollers on said other sides are cradled in bearing assemblies housed in structures comprised of a substance having non-expansible qualities in the presence of high heat, members secured in said body, varying expansion and contraction means positioned between said members and said structure for maintaining, according to the dictates of said temperature, a space between said piston and the chamber walls respective to said other sides.

7. The bearings described in claim 6 wherein each of said assemblies substantially encompasses each of said rollers, permitting only that part of the rollers that extend through said slots to contact the walls of the chamber opposite thereto.

8. The piston described in claim 2 wherein each bar is comprised of two sections spaced linearly from each other to form a minute gap therebetween, said sections being mounted in a sleeve composed of an oilless bearing substance non-expansible under high-heat operating conditions, means provided in said sections for causing, according to the dictates of said temperature, linear expansion or contraction therebetween for assuring contact of said bar at each of its ends against the chamber walls positioned at right angles to the wall of the piston wherein said bars are mounted.

9. The piston described in claim 2 wherein each roller is comprised of two sections having a uniform diameter throughout its length and functioning as a whole unit, a gap provided between said sections, means provided in said sections for causing, according to the dictates of said temperature, linear expansion or contraction therebetween for assuring contact of each roller at each of its ends against the chamber walls positioned at right angles to the side of the piston wherein said rollers are mounted.

10. The piston described in claim 2 wherein bars and rollers mounted in oppositely positioned sides are mounted at elevations different from the mountings of the bars and rollers in sides positioned at right angles to said first-mentioned sides.

11. The piston described in claim 2 wherein the sides are removable from the body thereof.

References Cited in the file of this patent

UNITED STATES PATENTS 2,409,555   Gadoux et al. _____ Oct. 15, 1946

FOREIGN PATENTS 615,220   France _____ Oct. 4, 1926